United States Patent
Merelli

(12) 
(10) Patent No.: US 6,244,982 B1
(45) Date of Patent: Jun. 12, 2001

(54) HYDRAULIC CHAIN TENSIONER WITH A PISTON HAVING A PLURALITY OF SLIDING ELEMENTS

(75) Inventor: Roberto Merelli, Monza Milan (IT)

(73) Assignee: MorseTEC Europe S.p.A., Milan (IT)

( * ) Notice: Subject to any disclaimer, the term of this patent is extended or adjusted under 35 U.S.C. 154(b) by 0 days.

(21) Appl. No.: 09/314,732

(22) Filed: May 18, 1999

(30) Foreign Application Priority Data

Sep. 9, 1998 (EP) .................................................. 98830527

(51) Int. Cl.[7] .................................. F16H 7/12; F16H 7/22
(52) U.S. Cl. ........................ 474/138; 474/110; 74/579 R; 188/277; 188/299
(58) Field of Search .................................... 474/110, 111, 474/138; 74/579 R, 579 E; 141/354; 188/277, 299

(56) References Cited

U.S. PATENT DOCUMENTS

| | | | |
|---|---|---|---|
| 3,885,608 | * | 5/1975 | Ayres ..................................... 141/354 |
| 4,077,272 | * | 3/1978 | Busso ..................................... 74/242.1 |
| 4,423,800 | * | 1/1984 | Kobisk et al. ........................ 188/277 |
| 4,539,001 | * | 9/1985 | Okabe .................................... 474/138 |
| 4,749,070 | * | 6/1988 | Moser et al. .......................... 188/299 |
| 4,799,577 | * | 1/1989 | De Carbon ............................ 188/277 |
| 4,826,470 | * | 5/1989 | Breon et al. ........................... 474/110 |
| 5,700,216 | * | 12/1997 | Simpson et al. ...................... 474/110 |
| 5,720,683 | * | 2/1998 | Patton ................................... 474/109 |

FOREIGN PATENT DOCUMENTS

| | | | |
|---|---|---|---|
| 0039586 | * | 11/1981 | (EP) ............................... 74/579 R X |
| 2320470 | * | 3/1977 | (FR) .................................. F16H/7/12 |
| 2113331 | * | 8/1983 | (GB) ..................................... 188/277 |
| 2203817 | * | 10/1988 | (GB) ................................... 74/579 E |
| 2093150 | * | 8/1982 | (GR) .................................. F16H/7/12 |

OTHER PUBLICATIONS

European Search report, EP 98 83 0527.2, dated 02/24/99.*

* cited by examiner

*Primary Examiner*—Vinh T. Luong
(74) *Attorney, Agent, or Firm*—Fitch, Even, Tabin & Flannery; Greg Dziegielewski

(57) ABSTRACT

A hydraulic tensioning device for a power transmission system having a belt or a chain includes a cylinder and piston assembly of which a movable element, generally the piston, acts on the belt or chain so as to ensure that it is tensioned and thus ensures taking up of any slack in the chain or belt. The piston includes a plurality of piston elements slidable along a central axis of the cylinder.

9 Claims, 2 Drawing Sheets

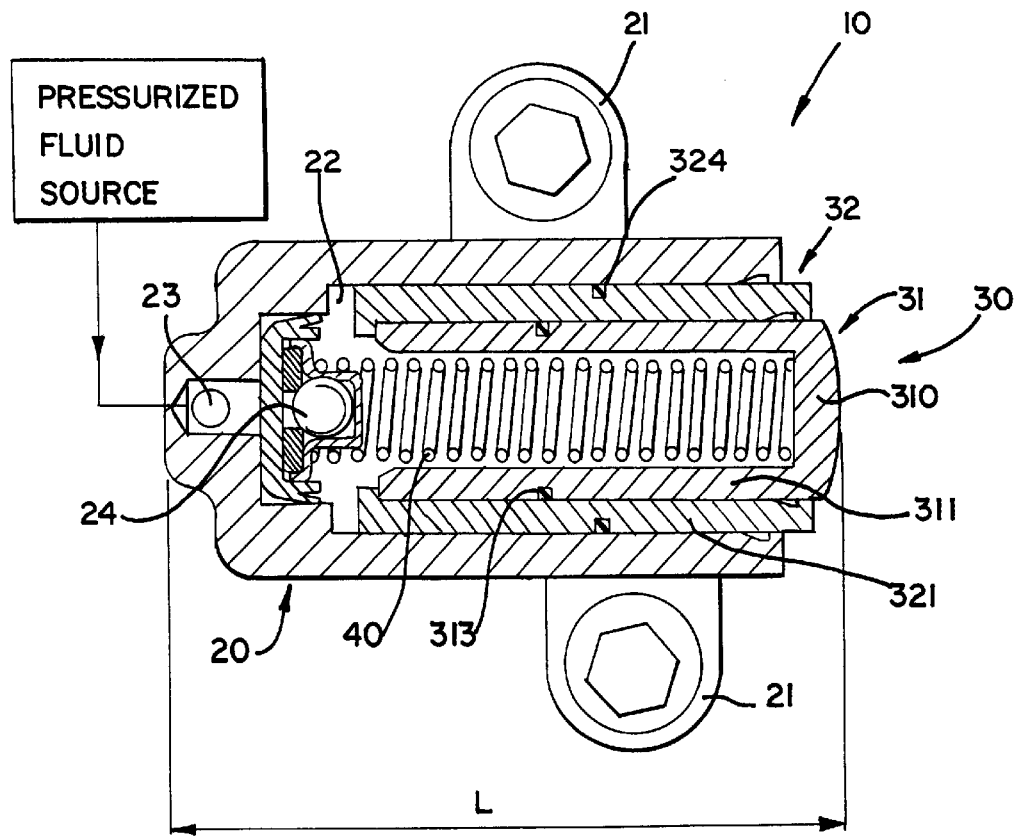
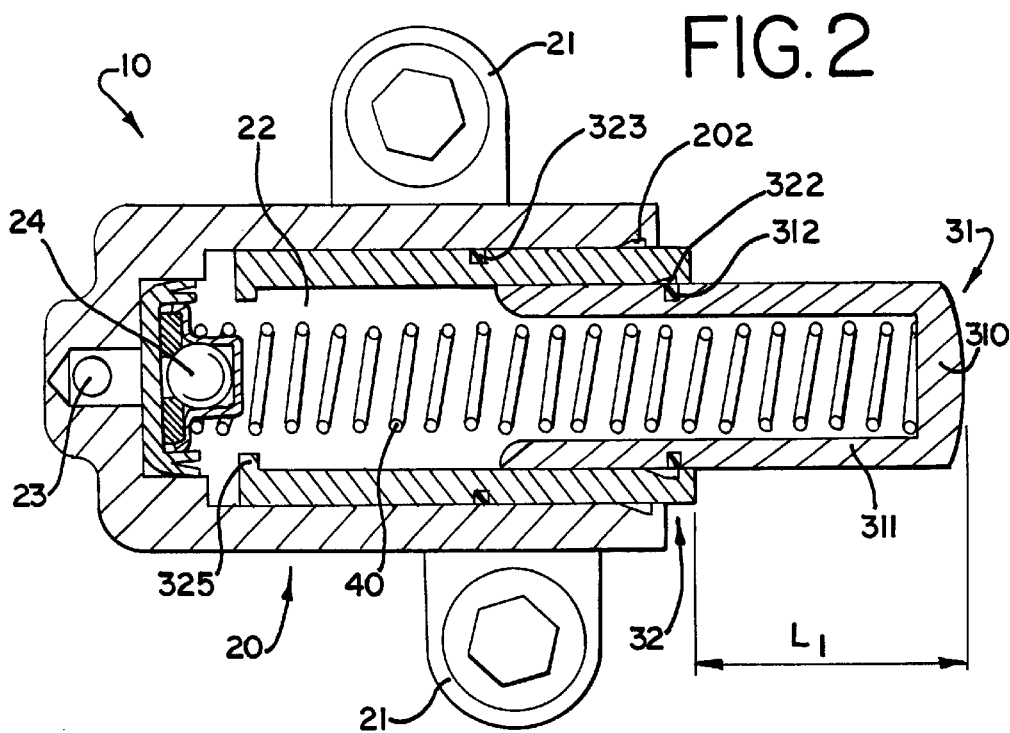

FIG.3
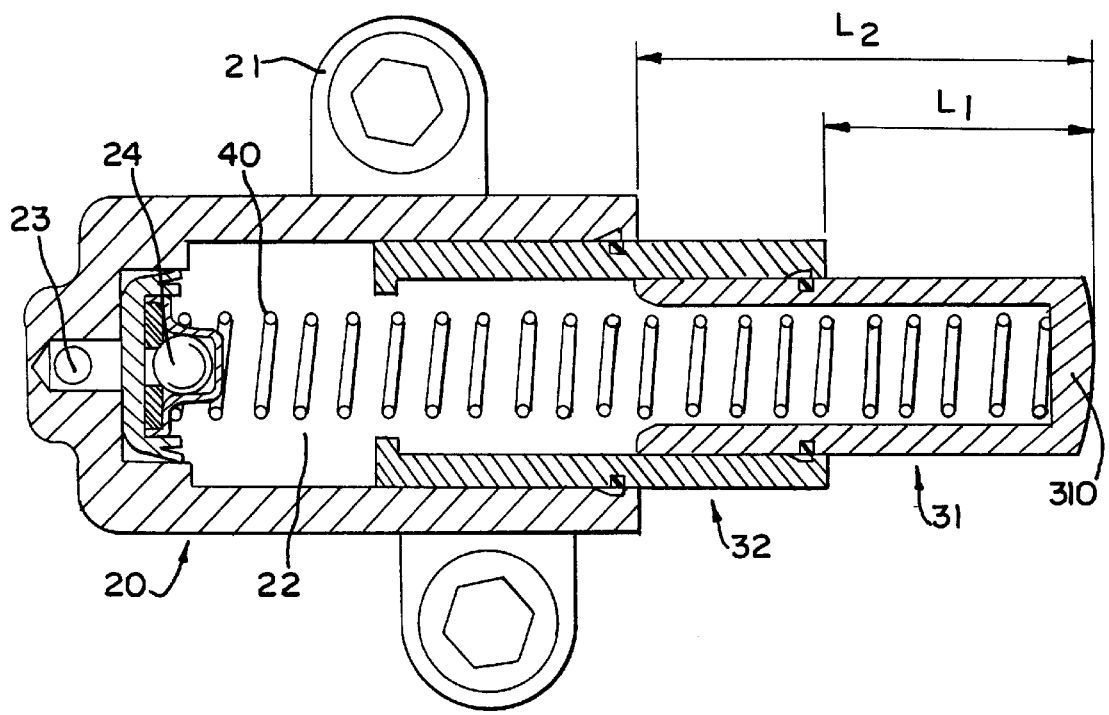
FIG.4
FIG.5
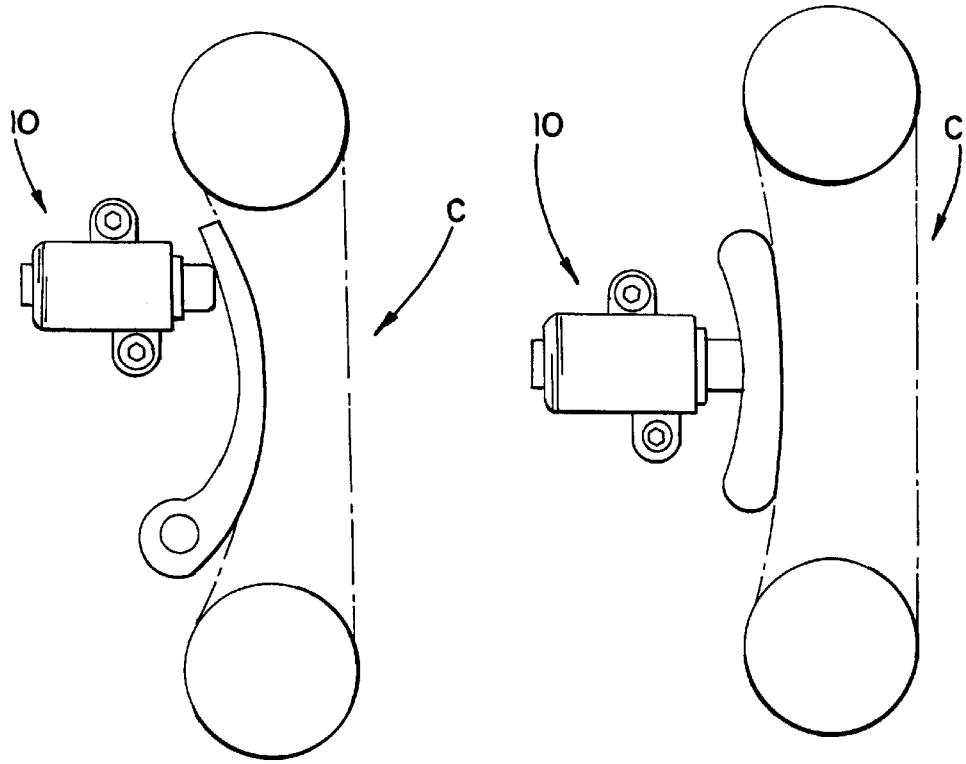

HYDRAULIC CHAIN TENSIONER WITH A PISTON HAVING A PLURALITY OF SLIDING ELEMENTS

BACKGROUND OF THE INVENTION

This invention relates to hydraulic tensioners used as a control device for a power transmission chain drive in automotive timing applications and more particularly to a hydraulic tensioner having a long maximum useful stroke, while having a normal cylinder-piston assembly length in the retracted state.

A tensioning device, such as a hydraulic tensioner, is used as a control device for a power transmission chain, or similar power transmission device, as a chain travels between a plurality of sprockets. As a chain transmits power from a driving sprocket to a driven sprocket, one portion or strand of the chain between the sprockets will be tight while the other portion of the chain will be slack. In order to impart and maintain a certain degree of tension in the slack portion of the chain, a hydraulic tensioner provides a piston that presses against a tensioner arm or other chain guiding mechanism.

Prevention of excess slack in the chain is particularly important in the case of a chain driven camshaft in an internal combustion engine because a chain without sufficient tension can skip a tooth or otherwise throw off the camshaft timing, possibly causing damage or rendering the engine inoperative. However, in the harsh environment of an internal combustion engine, various factors can cause fluctuations in the chain tension.

For instance, wide variations in temperature and thermal expansion coefficients among the various parts of the engine can cause the chain tension to vary between excessively high or low levels. During prolonged use, wear to the components of the power transmission can cause a decrease in chain tension. In addition, camshaft and crankshaft induced torsional vibrations cause considerable variations in chain tension. Reverse rotation of an engine, occurring for example in stopping or in failed attempts at starting, can also cause fluctuations in chain tension. For these reasons, a mechanism such as a hydraulic tensioner is desired to ensure the necessary tension on the slack side of the chain.

Typically, a hydraulic tensioner includes a piston in the form of a hollow cylinder. The piston slides within a bore in the housing and is biased outward from the housing in the direction of the tensioner arm and chain by a piston spring. The interior of the piston forms a high pressure fluid chamber with the bore or opening in the housing. The high pressure chamber is connected through a one way check valve to a low pressure chamber or reservoir, which provides or is connected to an exterior source of hydraulic fluid.

Upon start-up, the force of the spring on the piston causes the piston to move further outward as the chain begins to move. Outward movement of the piston creates a low pressure condition in the high pressure fluid chamber, or pressure differential across the inlet check valve. Accordingly, the inlet check valve opens and permits the flow of fluid from the reservoir, or low pressure chamber, into the high pressure chamber. When the high pressure chamber is sufficiently filled with fluid, the force on the chain that moves the piston inward will be balanced by the outward force from the spring and the resistance force of the fluid in the chamber. The force of the chain against the fluid in the chamber also causes the check valve to close, which prevents further addition of fluid to the chamber.

U.S. Pat. No. 4,826,470 to Breon et al. discloses a cylinder/piston assembly tensioning device, in which the cylinder forms a chamber for pressurized fluid. A static plunger is interposed between the cylinder and the piston, and a spring is interposed between a flange of the static plunger and the piston. The usable stroke of the piston is limited to the extension of the piston skirt, which must never completely leave the cylinder. This patent also describes a piston formed by two parts that create between them a path for the fluid to exit. The maximum useful stroke of the piston is nevertheless limited by the axial length of the skirt integral with the piston head.

U.S. Pat. No. 4,963,121 to Himura et al. also discloses a tensioning device for a belt or chain drive mechanism that includes a hollow piston element slidable inside a stationary cylinder. A fluid chamber is defined between two reciprocally sliding tubular elements of which one is fixed to the cylinder and the other moves under the action of a fluid and of a spring, integrally with the piston. The maximum useful outward stroke of the piston is defined by the length of the skirt integral with the piston head.

SUMMARY OF THE INVENTION

According to one aspect of the present invention, the tensioner includes a cylinder, which may be in the form of a bore in the tensioner housing, and a piston movable with respect to the cylinder. The piston includes two or more reciprocally sliding elements. A first distal element includes a piston head and a skirt. A second proximal element, or plurality of proximal elements, includes a skirt. A spring and pressurized fluid exert a bias between the end of the cylinder and the piston head on the distal element of the piston. Facing walls of the skirts of the piston elements and the cylinder have reciprocal engaging means to limit the movement of each with respect to the other.

The tensioner of the present invention allows the piston to extend from the cylinder for a longer stroke than previous tensioners. Yet, the axial measurement of the tensioner or axial length of the tensioner when retracted is equal to previous tensioning devices.

For a better understanding of these and other aspects and objects of the invention, reference should be made to the following detailed description taken in conjunction with the accompanying drawings.

BRIEF DESCRIPTION OF THE DRAWINGS

In the drawings,

FIG. 1 is a sectional view along a central axis of a cylinder-piston assembly of a tensioning device according to the invention, such as a plane substantially parallel to the drawing sheet and through the device shown in FIG. 5, in a retracted state.

FIG. 2 is a sectional view similar to FIG. 1 with the tensioning device shown in a partially extended state.

FIG. 3 is a sectional view similar to the previous figures, with the tensioning device shown in the position of maximum extension.

FIG. 4 illustrates a tensioning device with an oscillating shoe positioned on a chain drive of a timing system.

FIG. 5 illustrates a tensioning device with a translating shoe positioned on a chain drive of a timing system.

DETAILED DESCRIPTION OF THE PREFERRED EMBODIMENTS

A tensioning device illustrated in the figures is indicated generally by reference number 10.

The tensioning device 10 includes a body or cylinder 20 with a hollow center or bore, and a piston or plunger 30 formed of a plurality of elements. The piston includes at least two elements 31 and 32, respectively. The body or cylinder 20 has fixing tabs 21 for securing the tensioner to an engine body. The center of the cylinder, or bore, forms an internal cylindrical chamber 22. The chamber 22 communicates with a supply of pressurized fluid, generally oil, through an opening 23, and a check valve 24, in a manner well known and described in the prior art.

The piston 30 includes a first element or distal element 31 and a second element or proximal element 32. The first element includes a crown or piston head, 310, and a cylindrical skirt 311. The second, proximal element 32 includes a cylindrical skirt 321. Between the bottom of the cylindrical chamber 22 of the cylinder and the head 310 of the distal element a piston spring or pressure spring 40 is interposed. The outer wall of the skirt 311 of the distal element of the piston has a seat 312 for a piston ring 313, in an intermediate position along the length of the skirt 311. The inner surface of the piston element 32 has a groove 322 near the distal end thereof, to allow widening or expansion of the piston ring 313. Engagement of the piston ring 313 in the groove 322 prevents further extension of the distal element 31 of the piston with respect to the proximal element 32 of the piston.

The outer wall of the proximal element 32 of the piston has a seat 323 for a piston ring 324. In the proximity of the end the inner face of the cylinder 20, a corresponding groove 202 is able to receive the elastic ring 324 to stop further extension of the element 32 of the piston from the cylinder.

The annular grooves or housings 322, 202 preferably have the respective distal wall forming a steep step outwards (that is, toward the right in FIG. 1) and the proximal wall gently sloping inward, that is, toward the left in FIG. 1. The proximal element 32 of the piston 30 has a step 325 in its proximal part facing toward the axis to form an abutment for distal element 31 in a retracted position.

In the retracted or resting position illustrated in FIG. 1, the two elements 31 and 32 of the piston 30 are in the retracted state, i.e., the element 31 is completely or almost completely received inside the cylinder 20. This position can coincide with the initially set position of the tensioning device. The head 310 of the device may be brought into contact with a shoe, generally an oscillating shoe (FIG. 4) or a translating shoe (FIG. 5) which can be pushed against chain C, or the like, to tension it. When fluid is introduced through the opening 23 and the check valve 24 into the chamber 22, the piston is biased out of the cylinder through the action of the fluid and the spring 40. The bottom of the chamber 22 of the cylinder and the head 310 of the distal element 31 of the piston are pushed apart by the spring. This causes the element 31 to be extended (towards the right in FIG. 1) with respect to the second element 32, and the element 32 to be extended with respect to the cylinder 20. The position of the elements 31 and 32 with respect to each other and with respect to the cylinder 20 is determined by the balance of forces exerted by the pressure of the fluid and the spring, on one hand, and the tension of the chain on the other.

The extension of the piston elements is limited by engagement of the piston ring 312 in the groove 322, and by engagement of the piston ring 323 in the groove 202. The maximum extension position is illustrated in FIG. 3. As can be seen from the figures, for tensioning devices having a same axial length L, (FIG. 1), in the retracted position, a conventional tensioning device could give a maximum useful stroke L1 as shown in FIG. 2, while the new tensioning device permits a useful stroke L2, marked in FIG. 3, which is considerably greater than L1.

Those skilled in the art to which the invention pertains may make modifications and other embodiments employing the principles of this invention without departing from its spirit or essential characteristics particularly upon considering the foregoing teachings. The described embodiments are to be considered in all respects only as illustrative and not restrictive and the scope of the invention is, therefore, indicated by the appended claims rather than by the foregoing description. Consequently, while the invention has been described with reference to particular embodiments, modifications of structure, sequence, materials and the like would be apparent to those skilled in the art, yet still fall within the scope of the invention.

What is claimed is:

1. A hydraulic tensioner for a power transmission system comprising:

a cylinder and piston assembly, said cylinder having an inner chamber, said piston assembly slidably received within said inner chamber, said piston assembly movable between a retracted position and an extended position along a central axis of said cylinder, said piston assembly further adapted to operate to tension said power transmission system, a source of pressurized fluid in fluid communication with said inner chamber of said cylinder, a piston spring located between said inner chamber and said piston assembly, said pressurized fluid and said spring biasing said piston assembly in an extending direction from said cylinder, said piston assembly including at least two piston elements, each of said piston elements being slidable along said central axis of said cylinder, and at least one of said piston elements having a passage extending therethrough.

2. A tensioner according to claim 1, wherein said piston elements further comprise a distal element and a proximal element, said distal and proximal elements being telescopically slidable with respect to one another.

3. A tensioner according to claim 1, wherein said piston elements are cylindrical in shape, said elements include a plurality of spring rings disposed thereon and corresponding grooves formed therein which limit the extension of said distal element with respect to said proximal element, said rings and corresponding grooves restricting the extension of at least one of said piston elements with respect to said cylinder.

4. A tensioner according to claim 2, wherein each said piston element includes a skirt portion having an inner and an outer surface, a spring ring located on said outer surface of each respective skirt portion, grooves being provided on the facing of said inner surfaces of one of said piston elements and of said cylinder.

5. A tensioner according to claim 4, wherein each said groove has a steep distal circumferential wall and a gently sloping proximal circumferential wall.

6. A tensioner according to claim 1, wherein said first piston element is provided with a piston head and a skirt operatively connected therewith, said second piston element comprising a skirt in sealing relation with said cylinder, and said first piston element disposed within said second piston element in a telescopically slidable relation.

7. A tensioner according to claim 6, wherein said skirt of said second piston element is in sealing relation with said first piston element forming a generally continuous fluid chamber therein for said pressurized fluid when said first piston element is extended from said cylinder.

8. A tensioner according to claim 7, wherein said second piston element forms said fluid chamber when said first piston element is fully extended beyond said cylinder.

9. A hydraulic tensioner for a power transmission system comprising:
- a cylinder and piston assembly, said cylinder having an inner chamber, said piston assembly slidably received within said inner chamber, said piston assembly movable between a retracted position and an extended position along a central axis of said cylinder, said piston assembly further adapted to operate to tension said power transmission system,
- a source of pressurized fluid in fluid communication with said inner chamber of said cylinder,
- a piston spring located between said inner chamber and said piston assembly, said pressurized fluid and said spring biasing said piston assembly in an extending direction from said cylinder,
- said piston assembly including at least two piston elements, including a distal element and a proximal element, said distal and proximal elements being telescopically slidable with respect to one another,
- said distal element and said proximal element including a skirt portion having an inner and an outer surface, a spring ring located on said outer surface of each respective skirt portion, grooves being provided on the facing of said inner surfaces of one of said piston elements and of said cylinder,
- each of said grooves having a steep distal circumferential wall and a gently sloping proximal circumferential wall.

* * * * *